United States Patent
Chen et al.

(10) Patent No.: US 8,383,540 B2
(45) Date of Patent: Feb. 26, 2013

(54) CATALYST COMPOSITION WITH HALO-MALONATE INTERNAL ELECTRON DONOR AND POLYMER FROM SAME

(75) Inventors: Linfeng Chen, Missouri City, TX (US); Tak W. Leung, Houston, TX (US); Tao Tao, Houston, TX (US)

(73) Assignee: Dow Global Technologies LLC, Midland, MI (US)

( * ) Notice: Subject to any disclaimer, the term of this patent is extended or adjusted under 35 U.S.C. 154(b) by 109 days.

(21) Appl. No.: 12/974,402

(22) Filed: Dec. 21, 2010

(65) Prior Publication Data

US 2012/0157296 A1    Jun. 21, 2012

(51) Int. Cl.
    *B01J 31/38*    (2006.01)
    *C08F 210/06*   (2006.01)
    *C08F 110/06*   (2006.01)

(52) U.S. Cl. ........ 502/126; 502/127; 502/118; 502/128; 526/351; 526/348

(58) Field of Classification Search .......................... None
See application file for complete search history.

(56) References Cited

U.S. PATENT DOCUMENTS

| 5,539,309 | A  | 7/1996  | Van Wyk et al. |
| 6,392,230 | B1 | 5/2002  | Aita |
| 6,605,562 | B1 * | 8/2003 | Morini et al. ................. 502/127 |
| 6,825,146 | B2 | 11/2004 | Kilty et al. |
| 7,704,910 | B2 | 4/2010  | Hosaka et al. |

FOREIGN PATENT DOCUMENTS

| EP | 0086473    | 8/1983 |
| EP | 045977     | 1/1987 |
| EP | 0086644    | 5/1987 |
| EP | 125911     | 9/1989 |
| EP | 1533322    | 5/2005 |
| JP | 57085338   | * 11/1980 |
| JP | 57085338   | * 5/1982 |
| JP | 2004210913 | 7/2004 |
| WO | 0026259    | 5/2000 |
| WO | 2008120795 | 10/2008 |

OTHER PUBLICATIONS

JP 57085335, Abstract cited in SciFinder.*
Dhande Sudhakar Reddy, et al., Agnew. Chem. Int. Ed., 2008, 47, 164-168.

* cited by examiner

*Primary Examiner* — Melvin C Mayes
*Assistant Examiner* — Yun Qian
(74) *Attorney, Agent, or Firm* — Whyte Hirschboeck Dudek SC

(57) ABSTRACT

Disclosed herein are procatalyst compositions, catalyst compositions and polymers, i.e., propylene-based polymers, produced therefrom. The present procatalyst compositions contain a halo-malonate and a 2-fluoro-malonate in particular. The present catalyst compositions improve catalyst selectivity, improve catalyst activity, and also improve hydrogen response during polymerization. Propylene-based polymer produced from the present catalyst composition has a melt flow rate greater than 50 g/10 min.

12 Claims, No Drawings

CATALYST COMPOSITION WITH HALO-MALONATE INTERNAL ELECTRON DONOR AND POLYMER FROM SAME

BACKGROUND

The present disclosure provides a process for enhancing procatalyst and catalyst properties. The present disclosure provides formant polymers produced by these procatalysts/catalysts.

Worldwide demand for olefin-based polymers continues to grow as applications for these polymers become more diverse and more sophisticated. Known are Ziegler-Natta catalyst compositions for the production of olefin-based polymers and propylene-based polymers in particular. Ziegler-Natta catalyst compositions typically include a procatalyst containing a transition metal halide (i.e., titanium, chromium, vanadium), a cocatalyst such as an organoaluminum compound, and optionally an external electron donor. Many conventional Ziegler-Natta catalyst compositions include a magnesium chloride-supported titanium chloride procatalyst with a phthalate-based internal electron donor.

The health concerns from phthalate exposure are driving the art to find phthalate substitutes. Known are catalyst compositions containing a malonate or halo-malonate as an internal electron donor for producing propylene-based polymers. The art recognizes the need for additional halo-malonates suitable as phthalate substitutes in olefin polymerization catalysts.

SUMMARY

The present disclosure provides a Ziegler-Natta procatalyst composition containing a halo-malonate as an internal electron donor. The Applicant has discovered that fluorination, alone or in combination with alkyl substitution of the malonate central carbon atom, unexpectedly improves catalyst selectivity and/or catalyst activity. Applicant has further discovered that a procatalyst composition with a mixed internal electron donor composed of a halo-malonate in combination with an electron donor component also unexpectedly improves catalyst selectivity and/or catalyst activity.

In addition to improved catalyst properties, the present procatalyst compositions further exhibit desirable process characteristics (high hydrogen response, high catalyst activity) and produces olefin-based polymer, such as propylene-based polymers with low xylene solubles, high $T_{MF}$, good morphology and expanded in-reactor melt flow range.

The disclosure provides a procatalyst composition. In an embodiment, a procatalyst composition is provided and includes a magnesium moiety, a titanium moiety, and an internal electron donor. The internal electron donor includes a fluoro-malonate with the structure (II) below.

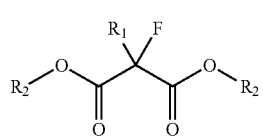

$R_1$ and $R_2$ are the same or different. Each of $R_1$ and $R_2$ is selected from a $C_1$-$C_{20}$ hydrocarbyl group and an unsubstituted $C_1$-$C_{20}$ hydrocarbyl group. In an embodiment, the fluoro-malonate is a compounded fluoro-malonate.

The disclosure provides another procatalyst composition. In an embodiment, a procatalyst composition is provided and includes a magnesium moiety, a titanium moiety, and a mixed internal electron donor. The mixed internal electron donor includes a halo-malonate and an electron donor component. The halo-malonate has the structure (II) below.

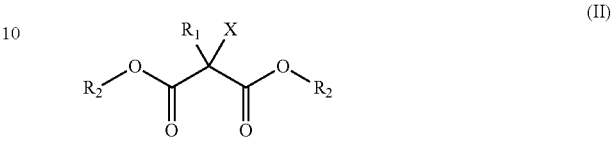

$R_1$ and $R_2$ are the same or different. Each of $R_1$ and $R_2$ is selected from a $C_1$-$C_{20}$ hydrocarbyl group and an unsubstituted $C_1$-$C_{20}$ hydrocarbyl group. X is selected from fluorine, chlorine, bromine, and iodine. In an embodiment, the mixed internal electron donor is a compounded mixed internal electron donor.

The disclosure provides a catalyst composition. In an embodiment, a catalyst composition is provided and includes a procatalyst composition, a cocatalyst, and optionally an external electron donor. The procatalyst composition contains a halo-malonate as disclosed herein.

The disclosure provides a polymeric composition. In an embodiment, a polymeric composition is provided and includes a propylene-based polymer which contains a halo-malonate with the structure (II) below.

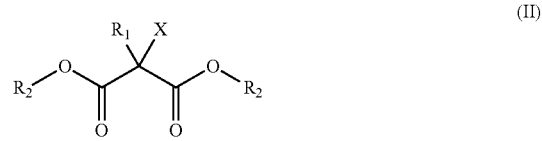

$R_1$ is selected from a $C_3$-$C_{20}$ secondary alkyl group, a $C_4$-$C_{20}$ tertiary alkyl group, a $C_6$-$C_{20}$ aryl group, and a $C_7$-$C_{20}$ alkylaryl group. $R_2$ is selected from a $C_1$-$C_{20}$ primary alkyl group and a substituted or unsubstituted $C_2$-$C_{20}$ 1-alkenyl group. X is selected from fluorine, chlorine, bromine, and iodine. The propylene-based polymer has a melt flow rate greater than 50 g/10 min.

In an embodiment, the propylene-based polymer has a xylene solubles content from 1 wt % to 4 wt %.

In an embodiment, the propylene-based polymer contains fluorine with X being fluorine.

An advantage of the present disclosure is the provision of an improved procatalyst composition.

An advantage of the present disclosure is the provision of a procatalyst composition with improved selectivity for the polymerization of olefin-based polymers.

An advantage of the present disclosure is a phthalate-free procatalyst composition.

An advantage of the present disclosure is the provision of a phthalate-free catalyst composition and a phthalate-free olefin-based polymer produced therefrom.

DETAILED DESCRIPTION

The present disclosure provides a procatalyst composition containing a halo-malonate as an internal electron donor. The present catalyst composition improves one or more of the following catalyst properties: activity, selectivity, and/or hydrogen response to produce propylene-based polymer with low xylene solubles, high $T_{MF}$, acceptable polydispersity and/or high melt flow.

In an embodiment, a procatalyst composition is provided. The procatalyst composition is a combination of a magnesium moiety, a titanium moiety, and a 2-halo-malonate such as a 2-fluoro-malonate.

Procatalyst Precursor

The procatalyst composition is formed by one, two, three, or more contacts between a procatalyst precursor and a halogenating agent in the presence of a halo-malonate (internal electron donor). The procatalyst precursor contains magnesium and may be a magnesium moiety compound (MagMo), a mixed magnesium titanium compound (MagTi), or a benzoate-containing magnesium chloride compound (BenMag). In an embodiment, the procatalyst precursor is a magnesium moiety ("MagMo") precursor. The "MagMo precursor" contains magnesium as the sole metal component. The MagMo precursor includes a magnesium moiety. Nonlimiting examples of suitable magnesium moieties include anhydrous magnesium chloride and/or its alcohol adduct, magnesium alkoxide or aryloxide, mixed magnesium alkoxy halide, and/or carbonated magnesium dialkoxide or aryloxide. In one embodiment, the MagMo precursor is a magnesium di ($C_{1-4}$) alkoxide. In a further embodiment, the MagMo precursor is diethoxymagnesium.

In an embodiment, the procatalyst precursor is a mixed magnesium/titanium compound ("MagTi"). The "MagTi precursor" has the formula $Mg_dTi(OR^e)_fX_g$ wherein $R^e$ is an aliphatic or aromatic hydrocarbon radical having 1 to 14 carbon atoms or COR' wherein R' is an aliphatic or aromatic hydrocarbon radical having 1 to 14 carbon atoms; each $OR^e$ group is the same or different; X is independently chlorine, bromine or iodine, preferably chlorine; d is 0.5 to 56, or 2 to 4; f is 2 to 116 or 5 to 15; and g is 0.5 to 116, or 1 to 3. The MagTi precursor is prepared by controlled precipitation through removal of an alcohol from the precursor reaction medium used in their preparation. In an embodiment, a reaction medium comprises a mixture of an aromatic liquid, such as a chlorinated aromatic compound, or chlorobenzene, with an alkanol, especially ethanol. Suitable halogenating agents include titanium tetrabromide, titanium tetrachloride or titanium trichloride, especially titanium tetrachloride. Removal of the alkanol from the solution used in the halogenation, results in precipitation of the solid precursor, having desirable morphology and surface area. In a further embodiment, the resulting procatalyst precursor is a plurality of particles that are uniform in particle size.

In an embodiment, the procatalyst precursor is a benzoate-containing magnesium chloride material. As used herein, a "benzoate-containing magnesium chloride" ("BenMag") can be a procatalyst (i.e., a halogenated procatalyst precursor) containing a benzoate internal electron donor. The BenMag material may also include a titanium moiety, such as a titanium halide. The benzoate internal donor is labile and can be replaced by other electron donors during procatalyst and/or catalyst synthesis. Nonlimiting examples of suitable benzoate groups include ethyl benzoate, methyl benzoate, ethyl p-methoxybenzoate, methyl p-ethoxybenzoate, ethyl p-ethoxybenzoate, ethyl p-chlorobenzoate. In one embodiment, the benzoate group is ethyl benzoate. Nonlimiting examples of suitable BenMag procatalyst precursors include catalysts of the trade names SHAC™ 103 and SHAC™ 310 available from The Dow Chemical Company, Midland, Mich. In an embodiment, the BenMag procatalyst precursor may be a product of halogenation of any procatalyst precursor (i.e., a MagMo precursor or a MagTi precursor) in the presence of a benzoate compound.

In a further embodiment, the procatalyst precursor is a solid material that contains chlorine. The chlorine-containing solid procatalyst precursor can be a MagMo compound, a MagTi compound, or a BenMag compound.

Procatalyst Composition

The procatalyst precursor is contacted one, two, three, or more times with a halogenating agent in the presence of halo-malonate to form the procatalyst composition. The halo-malonate is an internal electron donor. As used herein, an "internal electron donor" (or "IED") is a compound added or otherwise formed during formation of the procatalyst composition that donates at least one pair of electrons to one or more metals present in the resultant procatalyst composition. Not wishing to be bound by any particular theory, it is believed that during halogenation (and titanation) the internal electron donor (1) regulates the formation of active sites and thereby enhances catalyst stereoselectivity, (2) regulates the position of titanium on the magnesium-based support, (3) facilitates conversion of the magnesium and titanium moieties into respective halides and (4) regulates the crystallite size of the magnesium halide support during conversion. Thus, provision of the internal electron donor yields a procatalyst composition with enhanced stereoselectivity. The internal electron donor is one, two, or more halo-malonate(s).

The term "contacting," or "contact," or "contact step" in the context of procatalyst synthesis, is the chemical reaction that occurs in a reaction mixture (optionally heated) containing a procatalyst precursor/intermediate, a halogenating agent (with optional titanating agent), a halo-malonate, and a solvent. The reaction product of a "contact step" is a procatalyst composition (or a procatalyst intermediate) that is a combination of a magnesium moiety, a titanium moiety, complexed with the halo-malonate (internal electron donor).

Halogenation (or halogenating) occurs by way of a halogenating agent. A "halogenating agent," as used herein, is a compound that converts the procatalyst precursor (or procatalyst intermediate) into a halide form. A "titanating agent," as used herein, is a compound that provides the catalytically active titanium species. Halogenation and titanation convert the magnesium moiety present in the procatalyst precursor into a magnesium halide support upon which the titanium moiety (such as a titanium halide) is deposited.

In an embodiment, the halogenating agent is a titanium halide having the formula $Ti(OR^e)_fX_h$ wherein $R^e$ and X are defined as above, f is an integer from 0 to 3; h is an integer from 1 to 4; and f+h is 4. In this way, the titanium halide is simultaneously the halogenating agent and the titanating agent. In a further embodiment, the titanium halide is $TiCl_4$ and halogenation occurs by way of chlorination of the procatalyst precursor with the $TiCl_4$. The chlorination (and titanation) is conducted in the presence of a chlorinated or a non-chlorinated aromatic liquid, such as dichlorobenzene, o-chlorotoluene, chlorobenzene, benzene, toluene, or xylene. In yet another embodiment, the halogenation and the titanation are conducted by use of a mixture of halogenating agent and chlorinated aromatic liquid comprising from 40 to 60 volume percent halogenating agent, such as $TiCl_4$.

The reaction mixture is heated to a temperature from about 30° C. to about 150° C. for a duration of about 2 minutes to about 100 minutes during halogenation (chlorination).

In an embodiment, the procatalyst is made by contacting a solid chlorine-containing Mg precursor with a halogenating agent in the presence of a halogenated malonate and optionally an electron donor component.

In an embodiment, the procatalyst composition is made by two or more contact steps.

In an embodiment, the procatalyst composition is made by way of at least one contact step followed by at least one halogenation step.

In an embodiment, the procatalyst composition is made by way of at least one halogenation step followed by at least one contact step.

Halo-Malonate

The halo-malonate is a 2-halo-malonate with a halogen substituent at the 2-position. The 2-halo-malonate has the structure (I) below.

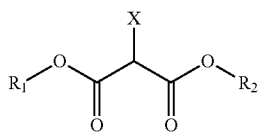

(I)

$R_1$ and $R_2$ are the same or different. Each of $R_1$ and $R_2$ is selected from a $C_1$-$C_{20}$ hydrocarbyl group and a substituted $C_1$-$C_{20}$ hydrocarbyl group. X is a halogen atom selected from fluorine, chlorine, and bromine.

As used herein, the term "hydrocarbyl" or "hydrocarbon" is a substituent containing only hydrogen and carbon atoms, including branched or unbranched, saturated or unsaturated, cyclic, polycyclic, fused, or acyclic species, and combinations thereof. Nonlimiting examples of hydrocarbyl groups include alkyl-, cycloalkyl-, alkenyl-, alkadienyl-, cycloalkenyl-, cycloalkadienyl-, aryl-, alkylaryl-, and alkynyl-groups.

As used herein, the term "substituted hydrocarbyl" or "substituted hydrocarbon" is a hydrocarbyl group that is substituted with one or more nonhydrocarbyl substituent groups. A nonlimiting example of a nonhydrocarbyl substituent group is a heteroatom. As used herein, a "heteroatom" is an atom other than carbon or hydrogen. The heteroatom can be a non-carbon atom from Groups IV, V, VI, and VII of the Periodic Table. Nonlimiting examples of heteroatoms include: halogens (F Cl, Br, I), N, O, P, B, S, and Si. A substituted hydrocarbyl group also includes a halohydrocarbyl group and a silicon-containing hydrocarbyl group. As used herein, the term "halohydrocarbyl" group is a hydrocarbyl group that is substituted with one or more halogen atoms.

The halo-malonate can be any 2-halo-malonate as set forth in Table 1. In a further embodiment, the halo-malonate is a 2-fluoro-malonate wherein X of structure (I) is a fluorine atom. In an embodiment, the 2-fluoro-malonate is diethyl 2-fluoromalonate.

In an embodiment, the halo-malonate is 2-hydrocarbyl-2-halo-malonate. The 2-hydrocarbyl-2-halo-malonate has the structure (II) as set forth below.

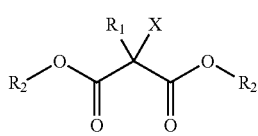

(II)

$R_1$ and $R_2$, are the same or different. Each of $R_1$ and $R_2$ is selected from a $C_1$-$C_{20}$ hydrocarbyl group and a substituted $C_1$-$C_{20}$ hydrocarbyl group. X is a halogen atom selected from fluorine, chlorine, and bromine.

In an embodiment, X is a fluorine atom and $R_1$ is a $C_1$-$C_{20}$ alkyl group. Nonlimiting examples of suitable $C_1$-$C_{20}$ alkyl group include an ethyl group, an n-propyl group, an n-butyl group, an isobutyl group, an n-hexyl group, and a 2-ethyl-hexyl group. In a further embodiment, $R_1$ is a secondary $C_3$-$C_{20}$ alkyl group or a tertiary $C_4$-$C_{20}$ alkyl group. Nonlimiting examples of suitable secondary or tertiary $C_3$-$C_{20}$ alkyl group include an isopropyl group, a tert-butyl group, a cyclopentyl group, and a cyclohexyl group.

In an embodiment, X is a fluorine atom and $R_1$ is a $C_6$-$C_{20}$ aryl group or a $C_7$-$C_{20}$ alkylaryl group. Nonlimiting examples of suitable $C_6$-$C_{20}$ aryl or $C_7$-$C_{20}$ alkylaryl group include a phenyl group, a 4-methylphenyl group, a 4-ethylphenyl group, and a 1-naphthyl group.

In an embodiment, X is a fluorine, chlorine, or bromine atom and $R_1$ is a secondary $C_3$-$C_{20}$ alkyl group, a tertiary $C_4$-$C_{20}$ alkyl group, a $C_6$-$C_{20}$ aryl group, or a $C_7$-$C_{20}$ alkylaryl group.

In an embodiment, $R_2$ is selected from a $C_1$-$C_{20}$ primary alkyl group, and a substituted or unsubstituted $C_2$-$C_{20}$ 1-alkenyl group.

The 2-hydrocarbyl-2-halo-malonate can be any 2-alkyl-2-halo-malonate as provided in Table 1. In an embodiment, the 2-alkyl-2-halo-malonate is 2-alkyl-2-fluoro-malonate such as diethyl 2-cyclopentyl-2-fluoro-malonate.

In an embodiment, the 2-alkyl-2-halo-malonate is diethyl-2-fluoro-2-cyclo-hexyl-malonate.

In an embodiment, the 2-alkyl-2-halo-malonate is diethyl-2-fluoro-2-isopropyl-malonate.

In an embodiment, the internal electron donor is a mixed internal electron donor. A "mixed internal electron donor" is an electron donor composed of (i) a halo-malonate and (ii) an electron donor component. The halo-malonate may be any halo-malonate with the structure (I)-(II) as disclosed above. An "electron donor component" is a composition other than the halo-malonate, added during procatalyst synthesis, which donates a pair of electrons to one or more metals present in the resultant procatalyst composition. The electron donor component reacts with the procatalyst precursor, the halogenating agent, (optionally the halo-malonate) during a contact step. This forms a procatalyst composition composed of a magnesium moiety, a titanium moiety, the halo-malonate, and the electron donor component (i.e., a reaction product of the procatalyst precursor, the halogenating agent the halo-malonate, and the electron donor component). The electron donor component may contain electron-donative groups such as carboxylate, carbonate, ether, amine, amide, and cabamate. In a further embodiment, the electron donor component may be selected from aliphatic ester, aromatic ester, phthalate, 1,3-diether, succinate, malonate, cyclic aliphatic dicarboxylate, diol diester, dicarbonate, ketoester, alkoxyester, alkoxyalkyl ester, and amidoester.

In an embodiment, the electron donor component is selected from $C_1$-$C_{20}$ hydrocarbyl ester or (poly)ester of $C_1$-$C_{20}$ aliphatic or aromatic carboxylic acid. In a further embodiment, the electron donor component is selected from ethyl acetate and bis(benzoyloxy)dimethylsilane.

Applicant has surprisingly discovered that a procatalyst composition with a 2-fluoro-malonate internal electron donor produces a procatalyst composition with improved selectivity, improved catalyst activity, improved hydrogen response, and/or improved melting point when compared to procatalyst compositions containing conventional malonate or halo-malonate. In particular, procatalyst compositions with 2-fluoro-malonate exhibit unexpected improvement in view of comparable procatalyst compositions containing conventional malonate without 2-halo as well as chloro-malonate and/or bromo-malonate.

The present procatalyst composition, with the fluoro-malonate is phthalate-free yet exhibits similar, or improved, selectivity and/or catalyst activity, hydrogen response, and/or melting point when compared to phthalate-containing procatalyst compositions. These improvements make the present procatalyst composition suitable for commercial polymer production.

In an embodiment, the present procatalyst composition contains greater than 2 wt %, or greater than 3 wt %, or greater than 4 wt %, or greater than 5 wt % to 15 wt %, or 10 wt % of a 2-fluoro-malonate. Weight percent is based on total weight of the procatalyst composition.

In an embodiment, the halo-malonate present in the procatalyst composition is a compounded halo-malonate. A "compounded halo-malonate" as used herein, is a halo-malonate complexed to a procatalyst component and formed by two or more contact steps during procatalyst synthesis. In a further embodiment, the halo-malonate is a compounded fluoro-malonate that is present in the procatalyst composition in an amount greater than 2 wt %, or greater than 3 wt %, or greater than 4 wt %, or greater than 5 wt % to 15 wt %, or 10 wt %. Weight percent is based on total weight of the procatalyst composition.

In an embodiment, the procatalyst composition contains a compounded mixed internal electron donor. A "compounded mixed internal electron donor", as used herein, is a halo-malonate and/or an electron donor component complexed to a procatalyst component and formed by two or more contact steps during procatalyst synthesis. The compounded mixed internal electron donor is present in an amount from 2 wt % to 15 wt %. Weight percent is based on total weight of the procatalyst composition.

In an embodiment, the magnesium moiety of the procatalyst composition is a magnesium chloride. The titanium moiety of the procatalyst composition is a titanium chloride.

The resulting procatalyst composition has a titanium content of from about 1.0 wt %, or about 1.5 wt %, or about 2.0 wt %, to about 6.0 wt %, or about 5.5 wt %, or about 5.0 wt %. The weight ratio of titanium to magnesium in the solid procatalyst composition is suitably between about 1:3 and about 1:160, or between about 1:4 and about 1:50, or between about 1:6 and 1:30. The 2-fluoro-malonate may be present in the procatalyst composition in a molar ratio of 2-fluoro-malonate to magnesium of from about 0.005:1 to about 1:1, or from about 0.01:1 to about 0.4:1. Weight percent is based on the total weight of the procatalyst composition.

The procatalyst composition may comprise two or more embodiments disclosed herein.

Catalyst Composition

The present disclosure provides a catalyst composition. In an embodiment, the catalyst composition includes a procatalyst composition containing a halo-malonate, a cocatalyst, and an external electron donor. The procatalyst composition may be any of the foregoing procatalyst compositions containing structures (I)-(II) as disclosed above. In an embodiment, the halo-malonate is a 2-fluoro-malonate.

As used herein, a "cocatalyst" is a substance capable of converting the procatalyst to an active polymerization catalyst. The cocatalyst may include hydrides, alkyls, or aryls of aluminum, lithium, zinc, tin, cadmium, beryllium, magnesium, and combinations thereof. In an embodiment, the cocatalyst is a hydrocarbyl aluminum compound represented by the formula $R_nAlX_{3-n}$ wherein n=1 2, or 3, R is an alkyl, and X is a halide or alkoxide. In an embodiment, the cocatalyst is selected from trimethylaluminum, triethylaluminum, triisobutylaluminum, and tri-n-hexylaluminum.

Nonlimiting examples of suitable hydrocarbyl aluminum compounds are as follows: methylaluminoxane, isobutylaluminoxane, diethylaluminum ethoxide, diisobutylaluminum chloride, tetraethyldialuminoxane, tetraisobutyldialuminoxane, diethylaluminum chloride, ethylaluminum dichloride, methylaluminum dichloride, dimethylaluminum chloride, triisobutylaluminum, tri-n-hexylaluminum, diisobutylaluminum hydride, di-n-hexylaluminum hydride, isobutylaluminum dihydride, n-hexylaluminum dihydride, diisobutylhexylaluminum, isobutyldihexylaluminum, trimethylaluminum, triethylaluminum, tri-n-propylaluminum, triisopropylaluminum, tri-n-butylaluminum, tri-n-octylaluminum, tri-n-decylaluminum, tri-n-dodecylaluminum, diisobutylaluminum hydride, and di-n-hexylaluminum hydride.

In an embodiment, the cocatalyst is triethylaluminum. The molar ratio of aluminum to titanium is from about 5:1 to about 500:1, or from about 10:1 to about 200:1, or from about 15:1 to about 150:1, or from about 20:1 to about 100:1. In another embodiment, the molar ratio of aluminum to titanium is about 45:1.

As used herein, an "external electron donor" (or "EED") is a compound added independent of procatalyst formation and includes at least one functional group that is capable of donating a pair of electrons to a metal atom. Bounded by no particular theory, it is believed that provision of one or more external electron donors in the catalyst composition affects the following properties of the formant polymer: level of tacticity (i.e., xylene soluble material), molecular weight (i.e., melt flow), molecular weight distribution (MWD), melting point, and/or oligomer level.

In an embodiment, the EED is a silicon compound having the general formula (III):

$$SiR_m(OR')_{4-m} \qquad (III)$$

wherein R independently each occurrence is hydrogen or a hydrocarbyl or an amino group, optionally substituted with one or more substituents containing one or more Group 14, 15, 16, or 17 heteroatoms. R contains up to 20 atoms not counting hydrogen and halogen. R' is a $C_{1-20}$ alkyl group, and m is 0, 1, 2, or 3. In an embodiment, R is $C_{6-12}$ aryl, aralkyl or alkylaryl, $C_{3-12}$ cycloalkyl, $C_{3-12}$ branched alkyl, or $C_{2-12}$ cyclic amino group, R' is $C_{1-4}$ alkyl, and m is 1 or 2.

In an embodiment, the silicon compound is dicyclopentyldimethoxysilane (DCPDMS), methylcyclohexyldimethoxysilane (MChDMS), or n-propyltrimethoxysilane (NPTMS), and any combination thereof.

In an embodiment, the present catalyst composition includes an activity limiting agent (ALA). An "activity limiting agent," as used herein is a material that reduces catalyst activity at elevated temperature, namely, in a polymerization reactor at polymerization conditions at a temperature greater than about 100° C. Provision of the ALA results in a self-limiting catalyst composition. As used herein, a "self-limiting" catalyst composition is a catalyst composition that demonstrates decreased activity at a temperature greater than about 100° C. In other words, "self-limiting" is the significant decline of catalyst activity when the reaction temperature rises above 100° C. compared to the catalyst activity under normal polymerization conditions with reaction temperature usually below 80° C. In addition, as a practical standard, if a polymerization process, such as a fluidized bed, gas-phase polymerization running at normal processing conditions is capable of interruption and resulting collapse of the bed with reduced risk with respect to agglomeration of polymer particles, the catalyst composition is said to be "self-limiting."

The ALA may be an aromatic ester or a derivative thereof, an aliphatic ester or derivative thereof, a diether, a poly(alkylene glycol) ester, and combinations thereof. Nonlimiting examples of suitable aromatic esters include $C_{1-10}$ alkyl or cycloalkyl esters of aromatic monocarboxylic acids. Suitable substituted derivatives thereof include compounds substituted both on the aromatic ring(s) or the ester group with one or more substituents containing one or more Group 14, 15 or 16 heteroatoms, especially oxygen. Examples of such substituents include (poly)alkylether, cycloalkylether, arylether, aralkylether, alkylthioether, arylthioether, dialkylamine, diarylamine, diaralkylamine, and trialkylsilane groups. The aromatic carboxylic acid ester may be a $C_{1-20}$ hydrocarbyl ester of benzoic acid wherein the hydrocarbyl group is unsubstituted or substituted with one or more Group 14, 15 or 16 heteroatom containing substituents and $C_{1-20}$ (poly)hydrocarbyl ether derivatives thereof, or $C_{1-4}$ alkyl benzoates and $C_{1-4}$ ring alkylated derivatives thereof, or methyl benzoate, ethyl benzoate, propyl benzoate, methyl p-methoxybenzoate, methyl p-ethoxybenzoate, ethyl p-methoxybenzoate, and ethyl p-ethoxybenzoate. In an embodiment, the aromatic carboxylic acid ester is ethyl p-ethoxybenzoate.

In an embodiment, the ALA is an aliphatic ester. The aliphatic ester may be a $C_{4-30}$ aliphatic acid ester, may be a mono- or a poly- (two or more) ester, may be straight chain or branched, may be saturated or unsaturated, and any combination thereof. The $C_{4-30}$ aliphatic acid ester may also be substituted with one or more Group 14, 15 or 16 heteroatom containing substituents. Nonlimiting examples of suitable $C_{4-30}$ aliphatic acid esters include $C_{1-20}$ alkyl esters of aliphatic $C_{4-30}$ monocarboxylic acids, $C_{1-20}$ alkyl esters of aliphatic $C_{8-20}$ monocarboxylic acids, $C_{1-4}$ allyl mono- and diesters of aliphatic $C_{4-20}$ monocarboxylic acids and dicarboxylic acids, $C_{1-4}$ alkyl esters of aliphatic $C_{8-20}$ monocarboxylic acids and dicarboxylic acids, and $C_{4-20}$ mono- or polycarboxylate derivatives of $C_{2-100}$ (poly)glycols or $C_{2-100}$ (poly)glycol ethers. In a further embodiment, the $C_{4-30}$ aliphatic acid ester may be isopropyl myristate and/or di-n-butyl sebacate.

In an embodiment, the ALA is isopropyl myristate.

In an embodiment, the ALA is a diether. The diether may be a dialkyl diether represented by the following formula:

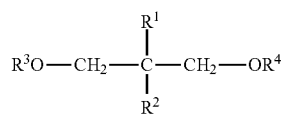

wherein $R_1$ to $R_4$ are independently of one another an alkyl, aryl or aralkyl group having up to 20 carbon atoms, which may optionally contain a group 14, 15, 16, or 17 heteroatom, provided that $R_1$ and $R_2$ may be a hydrogen atom.

In an embodiment, the ALA is a poly(alkylene glycol) ester. Nonlimiting examples of suitable poly(alkylene glycol) esters include poly(alkylene glycol) mono- or diacetates, poly(alkylene glycol) mono- or di-myristates, poly(alkylene glycol) mono- or di-laurates, poly(alkylene glycol) mono- or di-oleates, glyceryl tri(acetate), glyceryl tri-ester of $C_{2-40}$ aliphatic carboxylic acids, and any combination thereof. In an embodiment, the poly(alkylene glycol) moiety of the poly(alkylene glycol) ester is a poly(ethylene glycol).

The present catalyst composition may comprise two or more embodiments disclosed herein.

In an embodiment, a polymerization process is provided. The polymerization process includes contacting propylene and optionally at least one other olefin with a catalyst composition in a polymerization reactor under polymerization conditions. The catalyst composition may be any catalyst composition disclosed herein and includes a procatalyst composition with a halo-malonate internal electron donor, a cocatalyst, an d an external electron donor. The process also includes forming a propylene-based polymer. The propylene-based polymer contains the halo-malonate.

In an embodiment, the halo-malonate is a 2-fluoro-malonate having a structure (I)-(II) above. The process includes forming a propylene-based polymer that contains fluorine and has a $T_{MF}$ greater than 170° C., or from greater than 170° C. to 173° C.

In an embodiment, the process includes forming a propylene-based polymer containing a 2-fluoro-malonate and having a melt flow rate greater than 1 g/10 min, or greater than 10 g/10 min, or greater than 25 g/10 min, or greater than 50 g/10 min, or greater than 75 g/10 min, or greater than 100 g/10 min to 2000 g/10 min, or 1000 g/10 min, or 500 g/10 min, or 400 g/10 min, or 200 g/10 min.

The process includes contacting propylene and optionally at least one other olefin with the catalyst composition in a polymerization reactor. One or more olefin monomers can be introduced into the polymerization reactor along with the propylene to react with the catalyst and to form a polymer, a copolymer, (or a fluidized bed of polymer particles). Nonlimiting examples of suitable olefin monomers include ethylene, $C_{4-20}$ α-olefins, such as 1-butene, 1-pentene, 1-hexene, 4-methyl-1-pentene, 1-heptene, 1-octene, 1-decene, 1-dodecene and the like; $C_{4-20}$ diolefins, such as 1,3-butadiene, 1,3-pentadiene, norbornadiene, 5-ethylidene-2-norbornene (ENB) and dicyclopentadiene; $C_{8-40}$ vinyl aromatic compounds including styrene, o-, m-, and p-methylstyrene, divinylbenzene, vinylbiphenyl, vinylnapthalene; and halogen-substituted $C_{8-40}$ vinyl aromatic compounds such as chlorostyrene and fluorostyrene.

In an embodiment, the process includes contacting propylene with the catalyst composition to form a propylene homopolymer.

As used herein, "polymerization conditions" are temperature and pressure parameters within a polymerization reactor suitable for promoting polymerization between the catalyst composition and an olefin to form the desired polymer. The polymerization process may be a gas phase, a slurry, or a bulk polymerization process, operating in one, or more than one, polymerization reactor. Accordingly, the polymerization reactor may be a gas phase polymerization reactor, a liquid-phase polymerization reactor, or a combination thereof.

It is understood that provision of hydrogen in the polymerization reactor is a component of the polymerization conditions. During polymerization, hydrogen is a chain transfer agent and affects the molecular weight (and correspondingly the melt flow rate) of the resultant polymer.

In an embodiment, polymerization occurs by way of liquid phase polymerization.

In an embodiment, polymerization occurs by way of gas phase polymerization. As used herein, "gas phase polymerization" is the passage of an ascending fluidizing medium, the fluidizing medium containing one or more monomers, in the presence of a catalyst through a fluidized bed of polymer particles maintained in a fluidized state by the fluidizing medium. "Fluidization," "fluidized," or "fluidizing" is a gas-solid contacting process in which a bed of finely divided polymer particles is lifted and agitated by a rising stream of gas. Fluidization occurs in a bed of particulates when an upward flow of fluid through the interstices of the bed of particles attains a pressure differential and frictional resistance increment exceeding particulate weight. Thus, a "fluidized bed" is a plurality of polymer particles suspended in a fluidized state by a stream of a fluidizing medium. A "fluidizing medium" is one or more olefin gases, optionally a carrier gas (such as $H_2$ or $N_2$) and optionally a liquid (such as a hydrocarbon) which ascends through the gas-phase reactor.

A typical gas-phase polymerization reactor (or gas phase reactor) includes a vessel (i.e., the reactor), the fluidized bed, a distribution plate, inlet and outlet piping, a compressor, a cycle gas cooler or heat exchanger, and a product discharge system. The vessel includes a reaction zone and a velocity reduction zone, each of which is located above the distribution plate. The bed is located in the reaction zone. In an embodiment, the fluidizing medium includes propylene gas and at least one other gas such as an olefin and/or a carrier gas such as hydrogen or nitrogen.

In an embodiment, the contacting occurs by way of feeding the catalyst composition into the polymerization reactor and introducing the olefin into the polymerization reactor. In an embodiment, the process includes contacting the olefin with a cocatalyst. The cocatalyst can be mixed with the procatalyst composition (pre-mix) prior to the introduction of the procatalyst composition into the polymerization reactor. In another embodiment, cocatalyst is added to the polymerization reactor independently of the procatalyst composition. The independent introduction of the cocatalyst into the polymerization reactor can occur simultaneously, or substantially simultaneously, with the procatalyst composition feed.

The present disclosure provides a polymeric composition. The polymeric composition may be made by any of the foregoing polymerization processes. In an embodiment, a polymeric composition is provided and includes a propylene-based polymer containing a 2-fluoro-malonate. The propylene-based polymer has a $T_{MF}$ greater than 170° C., or greater than 172° C., or from greater than 170° C. to 173° C.

In an embodiment, the propylene-based polymer has a melt flow rate greater than 1 g/10 min. In a further embodiment, the propylene-based polymer has a melt flow rate greater than 10 g/10 min, or greater than 25 g/10 min, or greater than 50 g/10 min, or greater than 75 g/10 min, or greater than 100 g/10 min to 2000 g/10 min, or 1000 g/10 min, or 500 g/10 min, or 400 g/10 min, or 200 g/10 min.

In an embodiment, the polymeric composition has a melt flow rate greater than 25 g/10 min.

In an embodiment, the propylene-based polymer has a xylene solubles content from 1 wt % to 4 wt % weight percent is based on total weight of the propylene-based polymer.

In an embodiment, the polymeric composition is a propylene homopolymer.

In an embodiment, the polymeric composition is a propylene copolymer (such as a propylene/ethylene copolymer).

The present polymerization process and/or the present polymer composition may comprise two or more embodiments disclosed herein.

DEFINITIONS

All references to the Periodic Table of the Elements herein shall refer to the Periodic Table of the Elements, published and copyrighted by CRC Press, Inc., 2003. Also, any references to a Group or Groups shall be to the Groups or Groups reflected in this Periodic Table of the Elements using the IUPAC system for numbering groups. Unless stated to the contrary, implicit from the context, or customary in the art, all parts and percents are based on weight. For purposes of United States patent practice, the contents of any patent, patent application, or publication referenced herein are hereby incorporated by reference in their entirety (or the equivalent US version thereof is so incorporated by reference), especially with respect to the disclosure of synthetic techniques, definitions (to the extent not inconsistent with any definitions provided herein) and general knowledge in the art.

Any numerical range recited herein, includes all values from the lower value to the upper value, in increments of one unit, provided that there is a separation of at least 2 units between any lower value and any higher value. As an example, if it is stated that the amount of a component, or a value of a compositional or a physical property, such as, for example, amount of a blend component, softening temperature, melt index, etc., is between 1 and 100, it is intended that all individual values, such as, 1, 2, 3, etc., and all subranges, such as, 1 to 20, 55 to 70, 197 to 100, etc., are expressly enumerated in this specification. For values which are less than one, one unit is considered to be 0.0001, 0.001, 0.01 or 0.1, as appropriate. These are only examples of what is specifically intended, and all possible combinations of numerical values between the lowest value and the highest value enumerated, are to be considered to be expressly stated in this application. In other words, any numerical range recited herein includes any value or subrange within the stated range. Numerical ranges have been recited, as discussed herein, reference melt index, melt flow rate, and other properties.

The term "alkyl," as used herein, refers to a branched or unbranched, saturated or unsaturated acyclic hydrocarbon radical. Nonlimiting examples of suitable alkyl radicals include, for example, methyl, ethyl, n-propyl, i-propyl, n-butyl, t-butyl, i-butyl (or 2-methylpropyl), etc. The alkyls have 1 and 20 carbon atoms.

The term "aryl," as used herein, refers to an aromatic substituent which may be a single aromatic ring or multiple aromatic rings which are fused together, linked covalently, or linked to a common group such as a methylene or ethylene moiety. The aromatic ring(s) may include phenyl, naphthyl, anthracenyl, and biphenyl, among others. The aryls have 1 and 20 carbon atoms.

The terms "blend" or "polymer blend," as used herein, is a blend of two or more polymers. Such a blend may or may not be miscible (not phase separated at molecular level). Such a blend may or may not be phase separated. Such a blend may or may not contain one or more domain configurations, as determined from transmission electron spectroscopy, light scattering, x-ray scattering, and other methods known in the art.

The term "composition," as used herein, includes a mixture of materials which comprise the composition, as well as reaction products and decomposition products formed from the materials of the composition.

The term "comprising," and derivatives thereof, is not intended to exclude the presence of any additional component, step or procedure, whether or not the same is disclosed herein. In order to avoid any doubt, all compositions claimed herein through use of the term "comprising" may include any additional additive, adjuvant, or compound whether polymeric or otherwise, unless stated to the contrary. In contrast, the term, "consisting essentially of" excludes from the scope of any succeeding recitation any other component, step or procedure, excepting those that are not essential to operability. The term "consisting of" excludes any component, step or procedure not specifically delineated or listed. The term "or", unless stated otherwise, refers to the listed members individually as well as in any combination.

The term, "ethylene-based polymer," as used herein, refers to a polymer that comprises a majority weight percent polymerized ethylene monomer (based on the total weight of polymerizable monomers), and optionally may comprise at least one polymerized comonomer.

The term "interpolymer," as used herein, refers to polymers prepared by the polymerization of at least two different types of monomers. The generic term interpolymer thus includes copolymers, usually employed to refer to polymers prepared from two different monomers, and polymers prepared from more than two different types of monomers.

The term "olefin-based polymer" is a polymer containing, in polymerized form, a majority weight percent of an olefin, for example ethylene or propylene, based on the total weight of the polymer. Nonlimiting examples of olefin-based polymers include ethylene-based polymers and propylene-based polymers.

The term "polymer" is a macromolecular compound prepared by polymerizing monomers of the same or different type. "Polymer" includes homopolymers, copolymers, terpolymers, interpolymers, and so on. The term "interpolymer" means a polymer prepared by the polymerization of at least two types of monomers or comonomers. It includes, but is not limited to, copolymers (which usually refers to polymers prepared from two different types of monomers or comonomers, terpolymers (which usually refers to polymers prepared from three different types of monomers or comonomers), tetrapolymers (which usually refers to polymers prepared from four different types of monomers or comonomers), and the like.

A "primary alkyl group" has the structure —$CH_2R_1$ wherein $R_1$ is hydrogen or a substituted/unsubstituted hydrocarbyl group.

The term, "propylene-based polymer," as used herein, refers to a polymer that comprises a majority weight percent polymerized propylene monomer (based on the total amount of polymerizable monomers), and optionally may comprise at least one polymerized comonomer.

A "secondary alkyl group" has the structure —$CHR_1R_2$ wherein each of $R_1$ and $R_2$ is a substituted/unsubstituted hydrocarbyl group.

The term "substituted alkyl," as used herein, refers to an alkyl as just described in which one or more hydrogen atom bound to any carbon of the alkyl is replaced by another group such as a halogen, aryl, substituted aryl, cycloalkyl, substituted cycloalkyl, heterocycloalkyl, substituted heterocycloalkyl, halogen, haloalkyl, hydroxy, amino, phosphido, alkoxy, amino, thio, nitro, and combinations thereof. Suitable substituted alkyls include, for example, benzyl, trifluoromethyl and the like.

A "tertiary alkyl group" has the structure —$CR_1R_2R_3$ wherein each of $R_1$, $R_2$, and $R_3$ is a substituted/unsubstituted hydrocarbyl group.

Test Methods

Final melting point $T_{MF}$ is the temperature to melt the most perfect crystal in the sample and is regarded as a measure for isotacticity and inherent polymer crystallizability. The test was conducted using a TA Q100 Differential Scanning Calorimeter. A sample is heated from 0° C. to 240° C. at a rate of 80° C./min, cooled at the same rate to 0° C., then heated again at the same rate up to 150° C., held at 150° C. for 5 minutes and the heated from 150° C. to 180° C. at 1.25° C./min. The $T_{MF}$ is determined from this last cycle by calculating the onset of the baseline at the end of the heating curve.

Testing procedure:
(1) Calibrate instrument with high purity indium as standard.
(2) Purge the instrument head/cell with a constant 50 ml/min flow rate of nitrogen constantly.
(3) Sample preparation:
   Compression mold 1.5 g of powder sample using a 30-G302H-18-CX Wabash Compression Molder (30 ton): (a) heat mixture at 230° C. for 2 minutes at contact; (b) compress the sample at the same temperature with 20 ton pressure for 1 minute; (c) cool the sample to 45° F. and hold for 2 minutes with 20 ton pressure; (d) cut the plaque into 4 of about the same size, stack them together, and repeat steps (a)-(c) in order to homogenize sample.
(4) Weigh a piece of sample (preferably between 5 to 8 mg) from the sample plaque and seal it in a standard aluminum sample pan. Place the sealed pan containing the sample on the sample side of the instrument head/cell and place an empty sealed pan in the reference side. If using the auto sampler, weigh out several different sample specimens and set up the machine for a sequence.
(5) Measurements:
   (i) Data storage: off
   (ii) Ramp 80.00° C./min to 240.00° C.
   (iii) Isothermal for 1.00 min
   (iv) Ramp 80.00° C./min to 0.00° C.
   (v) Isothermal for 1.00 min
   (vi) Ramp 80.00° C./min to 150.00° C.
   (vii) Isothermal for 5.00 min
   (viii) Data storage: on
   (ix) Ramp 1.25° C./min to 180.00° C.
   (x) End of method
(6) Calculation: $T_{MF}$ is determined by the interception of two lines. Draw one line from the base-line of high temperature. Draw another line from through the deflection of the curve close to the end of the curve at high temperature side.

Melt flow rate (MFR) is measured in accordance with ASTM D 1238-01 test method at 230° C. with a 2.16 kg weight for propylene-based polymers.

Polydispersity Index (PDI) is measured by an AR-G2 rheometer which is a stress control dynamic spectrometer manufactured by TA Instruments using a method according to Zeichner G R, Patel P D (1981) "A comprehensive Study of Polypropylene Melt Rheology" Proc. Of the 2nd World Congress of Chemical Eng., Montreal, Canada. An ETC oven is used to control the temperature at 180° C.±0.1° C. Nitrogen is used to purge the inside the oven to keep the sample from degradation by oxygen and moisture. A pair of 25 mm in diameter cone and plate sample holder is used. Samples are compress molded into 50 mm×100 mm×2 mm plaque. Samples are then cut into 19 mm square and loaded on the center of the bottom plate. The geometries of upper cone is (1) Cone angle: 5:42:20 (deg:min:I); (2) Diameter: 25 mm; (3) Truncation gap: 149 micron. The geometry of the bottom plate is 25 mm cylinder.

Testing procedure:
(1) The cone & plate sample holder are heated in the ETC oven at 180° C. for 2 hours. Then the gap is zeroed under blanket of nitrogen gas.
(2) Cone is raised to 2.5 mm and sample loaded unto the top of the bottom plate.
(3) Start timing for 2 minutes.
(4) The upper cone is immediately lowered to slightly rest on top of the sample by observing the normal force.
(5) After two minutes the sample is squeezed down to 165 micron gap by lower the upper cone.
(6) The normal force is observed. When the normal force is down to <0.05 Newton the excess sample is removed from the edge of the cone and plate sample holder by a spatula.

(7) The upper cone is lowered again to the truncation gap which is 149 micron.
(8) An Oscillatory Frequency Sweep test is performed under these conditions:
  Test delayed at 180° C. for 5 minutes.
  Frequencies: 628.3 r/s to 0.1 r/s.
  Data acquisition rate: 5 point/decade.
  Strain: 10%
(9) When the test is completed the crossover modulus (Gc) is detected by the Rheology Advantage Data Analysis program furnished by TA Instruments.
(10) PDI=100,000÷Gc (in Pa units).

Xylene Solubles (XS) is measured using a $^1$NMR method as described in U.S. Pat. No. 5,539,309, the entire content of which is incorporated herein by reference.

By way of example and not by limitation, examples of the present disclosure will now be provided.

EXAMPLES

1. Procatalyst Precursor

MagTi-1 is used as a procatalyst precursor. MagTi-1 is a mixed Mg/Ti precursor with composition of $Mg_3Ti(OEt)_8Cl_2$ (prepared according to example 1 in U.S. Pat. No. 6,825,146). Titanium content for each of the resultant procatalyst compositions is listed in Table 1. The peaks for internal donors are assigned according to retention time from GC analysis.

A. First Contact 3.00 g of MagTi-1 is charged into a flask equipped with mechanical stirring and with bottom filtration. 60 ml of a mixed solvent of $TiCl_4$ and chlorobenzene (1/1 by volume) is introduced into the flask followed immediately by addition of 2.52 mmol of malonate (including halo-malonate and/or malonate) or DiBP. The mixture is heated to 115° C. in 15 minutes and remains at 115° C. for 60 minutes with stirring at 250 rpm before filtering off the liquid.

B. Second Contact/Halogenation 60 ml of mixed solvent and optionally 2.52 mmol of (halo-)malonate are added again and the reaction is allowed to continue at the same desired temperature for 30 minutes with stirring followed by filtration.

C. Third Contact/Halogenation

Same as step (B) above.

The final procatalyst composition is rinsed three times at room temperature with 70 ml of isooctane and dried under nitrogen flow for 2 hours.

Procatalyst properties are set forth in Table 1 below. Weight percent is based on total weight of the procatalyst composition. The data in Table 1 are based on MagTi-1 as the procatalyst precursor. Abbreviations in Table 1 indicate the following: MA—malonate or halo-malonate, EtO—Ethoxide, ID—Internal Electron Donor (complexed form of MA or DiBP in procatalyst), EB—Ethyl Benzoate, DiBP—Diisobutyl Phthalate. Wt % is based on total weight of the procatalyst composition.

DiBP in Table 1 is a comparative sample.

TABLE 1

| Ref # | Structure | 1$^{st}$ MA Addition | 2$^{nd}$ MA Addition | Ti (%) | EtO (%) | ID (%) |
|---|---|---|---|---|---|---|
| 1 | diethyl fluoromalonate | 2.52 | | 2.21 | 0.37 | 2.72 |
| 2 | diethyl chloromalonate | 2.52 | | 1.50 | 0.60 | 1.69 |
| 3 | diethyl bromomalonate | 2.52 | | 2.76 | 0.71 | 1.76 |
| 4 | diethyl 2-fluoro-2-methylmalonate | 2.52 | | 2.52 | 0.33 | 8.81 |
| 5 | diethyl 2-chloro-2-methylmalonate | 2.52 | | 2.92 | 0.40 | 2.46 |
| 6 | diethyl 2-bromo-2-methylmalonate | 2.52 | | 2.09 | 0.34 | 4.61 |

TABLE 1-continued

| Ref # | Structure | 1st MA Addition | 2nd MA Addition | Ti (%) | EtO (%) | ID (%) |
|---|---|---|---|---|---|---|
| 7 | diethyl methylmalonate | 2.52 | | 2.45 | 0.29 | 9.06 |
| 8 | diethyl (cyclopentyl)fluoromalonate | 2.52 | | 2.96 | 0.29 | 10.74 |
| 9 | diethyl (cyclopentyl)chloromalonate | 2.52<br>2.52 | <br>2.52 | 2.93<br>2.57 | 0.44<br>0.38 | 8.71<br>10.84 |
| 10 | diethyl (cyclopentyl)methylmalonate | 2.52<br>2.52 | <br>2.52 | 3.26<br>2.50 | 0.25<br>0.28 | 10.12<br>11.45 |
| 11 | diethyl cyclopentylmalonate | 2.52<br>2.52 | <br>2.52 | 2.65<br>2.68 | 0.43<br>0.33 | 11.85<br>10.48 |
| DiBP | diisobutyl phthalate | 2.52 | | 3.04 | 0.18 | 12.36 |
| 12 | diethyl (cyclohexyl)fluoromalonate | 2.52<br>2.52 | <br>2.52 | 2.82<br>2.46 | 0.53<br>0.35 | 10.83<br>9.07 |
| 13 | diethyl (isopropyl)fluoromalonate | 2.52<br>2.52 | <br>2.52 | 3.27<br>2.09 | 0.31<br>0.49 | 9.33<br>10.66 |

TABLE 1-continued

| Ref # | Structure | 1st MA Addition | 2nd MA Addition | Ti (%) | EtO (%) | ID (%) |
|---|---|---|---|---|---|---|
| 14 | 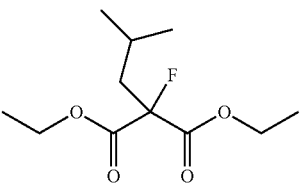 | 2.52<br>2.52 | <br>2.52 | 3.08<br>2.22 | 0.36<br>0.29 | 9.38<br>9.42 |
| 15 | 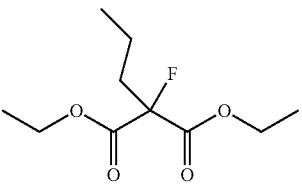 | 2.52<br>2.52 | <br>2.52 | 2.93<br>1.92 | 0.54<br>0.46 | 9.12<br>7.93 |

2. Polymerization

Polymerization is performed in liquid propylene in a 1-gallon autoclave. After conditioning, the reactor is charged with 1375 g of propylene and a targeted amount of hydrogen and brought to 62° C. 0.25 mmol of dicyclopentyldimethoxysilane (or n-propyltrimethyoxysilane) is added to 7.2 ml of a 0.27 M triethylaluminum solution in isooctane, followed by addition of a 5.0 wt % procatalyst slurry in mineral oil (actual solid weight is indicated in Table 2 below). The mixture is premixed at ambient temperature for 20 minutes before being injected into the reactor to initiate the polymerization. The premixed catalyst components are flushed into the reactor with isooctane using a high pressure catalyst injection pump. After the exotherm, the temperature is maintained at 67° C. Total polymerization time was 1 hour.

Polymer samples are tested for melt flow rate (MFR), xylene solubles (XS), polydispersity index (PDI), and final melting point ($T_{MF}$). XS is measured using $^1$H NMR method.

DiBP in any of Tables 2-8 is a comparative sample.

Catalyst performance and polymer properties are provided in Table 2-8 below. Weight percent is based on total weight of the polymer. Abbreviations in Tables 2-8 indicate the following.

NM=Not measured
N/A=Not available
D=Dicyclopentyldimethoxysilane
N=N-propyltrimethyoxysilane

TABLE 2

Catalyst Performance and Polymer Properties of Halogenated Malonates

| Ref # | Structure | Number of ID Additions | Activity (kg/g-hr) | MFR (g/10 min) | XS (%) | PDI | $T_{MF}$ (° C.) |
|---|---|---|---|---|---|---|---|
| 1 | 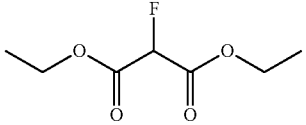 | 1 | 13.0 | 3.7 | 7.42 | 5.25 | 171.03 |
| 2* | 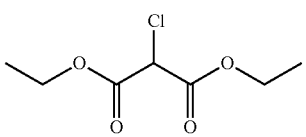 | 1 | 15.9 | 4.5 | 8.01 | 5.36 | 170.56 |
| 3* | 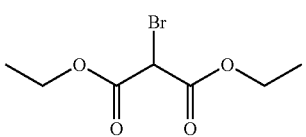 | 1 | 14.7 | 5.0 | 8.36 | 5.24 | 170.68 |

*Comparative

DCPDMS is used as EED. 16.7 mg of procatalyst and 67 mmol of $H_2$ are used for each polymerization test.

Results in Table 2 show that among the simple halogenated malonates the fluorine derivative (1) has the best selectivity with good catalyst activity.

TABLE 3

Catalyst Performance and Polymer Properties of Halogenated Methylmalonates

| Ref # | Structure | Number of ID Additions | Activity (kg/g-hr) | MFR (g/10 min) | XS (%) | PDI | $T_{MF}$ (°C.) |
|---|---|---|---|---|---|---|---|
| 4 | diethyl 2-fluoro-2-methylmalonate | 1 | 18.6 | 2.8 | 5.68 | 4.89 | 171.62 |
| 5* | diethyl 2-chloro-2-methylmalonate | 1 | 18.7 | 4.1 | 8.37 | 5.23 | 170.92 |
| 6* | diethyl 2-bromo-2-methylmalonate | 1 | 19.9 | 2.7 | 6.15 | 5.17 | 171.26 |
| 7* | diethyl methylmalonate | 1 | 21.1 | 3.6 | 6.86 | 5.16 | 171.11 |

*Comparative
DCPDMS is used as EED. 16.7 mg of procatalyst and 67 mmol of $H_2$ are used for each polymerization test.

For methylmalonates, substitution with a chlorine atom (5) leads to higher XS and bromine (6) leads to lower XS. However, the lowest XS is obtained with fluorine substitution (4).

TABLE 4

Catalyst Performance and Polymer Properties of Halogenated Cyclopentylmalonates Number

| Ref # | Structure | Number of ID Additions | Activity (kg/g-hr) | MFR (g/10 min) | XS (%) | PDI | $T_{MF}$ (°C.) |
|---|---|---|---|---|---|---|---|
| 8 | diethyl 2-cyclopentyl-2-fluoromalonate | 1 | 25.3 | 1.9 | 3.28 | 4.54 | 172.05 |
| 9 | diethyl 2-chloro-2-cyclopentylmalonate | 1 | 27.8 | 2.4 | 4.83 | 4.52 | 172.09 |
|   |   | 2 | 25.5 | 1.8 | 3.17 | 4.44 | 172.39 |
| 10* | diethyl 2-cyclopentyl-2-methylmalonate | 1 | 28.6 | 2.8 | 5.67 | 4.77 | 170.77 |
|   |   | 2 | 29.9 | 2.0 | 5.15 | 4.84 | 171.46 |

TABLE 4-continued

Catalyst Performance and Polymer Properties of Halogenated Cyclopentylmalonates Number

| Ref # | Structure | Number of ID Additions | Activity (kg/g-hr) | MFR (g/10 min) | XS (%) | PDI | $T_{MF}$ (°C.) |
|---|---|---|---|---|---|---|---|
| 11* | (cyclopentyl malonate diethyl ester) | 1 | 25.2 | 3.3 | 4.94 | 4.99 | 171.11 |
|  |  | 2 | 15.3 | 2.1 | 3.56 | 4.98 | 171.34 |
| DiBP* | (diisobutyl phthalate) | 1 | 32.9 | 1.8 | 3.87 | 4.68 | 171.92 |

*Comparative
DCPDMS is used as EED. 16.7 mg of procatalyst and 67 mmol of $H_2$ are used for each polymerization test.

Chlorine substitution of cyclopentylmalonate (9) leads to improvement in XS over the unsubstituted compound (11) as well as the methyl-substituted compound (10).

Procatalyst made by double addition of the chlorinated malonate (9) produces polymer with improvement properties compared to the DiBP procatalyst (XS and $T_{MF}$).

The fluorinated derivative (8) exhibits the best performance for procatalysts made from a single contact step during procatalyst synthesis.

TABLE 5

Comparison of Catalyst Performance between Diethyl 2-Cyclopentyl-2-fluoromalonate (8) and DiBP

| Ref # | Structure | EED | $H_2$ (mmol) | Activity (kg/g-hr) | MFR (g/10 min) | XS (%) | PDI | $T_{MF}$ (°C.) |
|---|---|---|---|---|---|---|---|---|
| 8 | (diethyl 2-cyclopentyl-2-fluoromalonate) | D | 67 | 22.0 | 2.6 | 2.70 | 4.52 | 172.20 |
|  |  | D | 446 | 17.0 | 27.4 | 1.98 | 4.82 | 171.30 |
|  |  | D | 670 | 33.1 | 61.6 | 2.33 | 4.76 | 171.00 |
|  |  | D | 893 | 30.4 | 77.6 | 2.12 | 4.77 | 170.64 |
| DiBP* | (diisobutyl phthalate) | D | 67 | 30.1 | 2.3 | 3.82 | 4.67 | 172.27 |
|  |  | D | 446 | 21.3 | 26.8 | 2.31 | 5.29 | 171.24 |
|  |  | D | 670 | 16.8 | 43.2 | 1.78 | 5.41 | 171.19 |
|  |  | D | 893 | 22.9 | 74.2 | 1.77 | 5.26 | 170.81 |
| 8 | (diethyl 2-cyclopentyl-2-fluoromalonate) | N | 45 | 8.8 | 3.2 | 2.23 | 4.02 | 170.48 |
|  |  | N | 313 | 11.2 | 40.8 | 2.30 | 4.38 | 170.36 |
|  |  | N | 436 | 14.8 | 98.2 | 2.31 | 4.42 | 169.30 |

TABLE 5-continued

Comparison of Catalyst Performance between Diethyl 2-Cyclopentyl-2-fluoromalonate (8) and DiBP

| Ref # | Structure | EED | $H_2$ (mmol) | Activity (kg/g-hr) | MFR (g/10 min) | XS (%) | PDI | $T_{MF}$ (°C.) |
|---|---|---|---|---|---|---|---|---|
| DiBP* | (phthalate diester structure) | N | 45 | 12.4 | 3.7 | 2.37 | 4.14 | 170.40 |
| | | N | 313 | 14.3 | 23.4 | 2.28 | 4.63 | 169.76 |
| | | N | 436 | 12.1 | 89.4 | 2.38 | 4.57 | 169.41 |

*Comparative
8.4 mg of procatalyst is used for each polymerization test.

The performance of compound 8 is overall quite close to DiBP in regard of catalyst activity, XS, $H_2$ response, and $T_{MF}$, except that PDI remains almost the same regardless of MF changing while PDI for DiBP catalyst increases with MF. The narrower PDI is beneficial for some end-use applications, such as fiber, biaxially oriented polypropylene, and thin-walled injection molding.

TABLE 6

Catalyst Performance and Polymer Properties of Other Halogenated Malonates

| Ref # | Structure | Number of ID Additions | Activity (kg/g-hr) | MFR (g/10 min) | XS (%) | PDI | $T_{MF}$ (°C.) |
|---|---|---|---|---|---|---|---|
| 12 | (cyclohexyl fluoromalonate diethyl ester) | 1 | 22.4 | 3.5 | 5.38 | 4.99 | 170.67 |
| | | 2 | 23.9 | 2.4 | 4.33 | | |
| 13 | (isopropyl fluoromalonate diethyl ester) | 1 | 17.7 | 2.7 | 3.13 | 4.66 | 171.05 |
| | | 2 | 22.6 | NM | 3.44 | 4.89 | 171.88 |
| 14 | (isobutyl fluoromalonate diethyl ester) | 1 | 26.4 | 3.6 | 5.88 | 5.00 | 170.87 |
| | | 2 | 24.4 | 2.4 | 4.57 | 4.84 | 171.68 |
| 15 | (n-propyl fluoromalonate diethyl ester) | 1 | 22.6 | 3.1 | 4.9 | 4.82 | 170.51 |
| | | 2 | 20.1 | 2.3 | 4.2 | 4.80 | 171.44 |

DCPDMS is used as EED. 16.7 mg of procatalyst and 67 mmol of $H_2$ are used for each polymerization test.

These fluorinated hydrocarbyl-substituted malonates (Ref. #'s 12-15) show good activity and good isotacticity selectivity. Furthermore, improved XS is obtained via multiple donor additions. Compound 13 shows best performance among the group, and similar to compound 8.

ity, comparable to the DiBP catalyst. Surprisingly, $H_2$ response is significantly improved, especially at high $H_2$ level. The procatalyst made by double donor addition (i.e., catalyst composition containing compounded halo-mal-

TABLE 7

Effects of Ethyl Acetate as a Secondary Donor

| Ref # | Structure | Number of Additives | SCA | $H_2$ (mmol) | Activity (kg/g-hr) | MFR (g/10 min) | XS (%) | PDI | $T_{MF}$ (° C.) |
|---|---|---|---|---|---|---|---|---|---|
| DiBP* | | 1 | D | 446 | 36.5 | 25.8 | 2.60 | 4.83 | 170.88 |
| | | | D | 670 | 31.8 | 36.8 | 2.16 | 4.85 | 170.81 |
| 8 + EtOAc | | 1 | D | 446 | 31.9 | 27.9 | 2.57 | 4.76 | 170.77 |
| | | | D | 670 | 27.0 | 53.9 | 2.16 | | 170.53 |
| | | 2 | D | 446 | 22.1 | NM | 1.90 | 4.71 | 170.74 |
| | | | D | 670 | 28.0 | 54.9 | 1.70 | 4.60 | 170.52 |
| DiBP* | | 1 | N | 446 | 15.5 | 61.5 | 2.54 | 4.79 | 169.54 |
| | | | N | 670 | 11.5 | 110.1 | 2.45 | 4.82 | 169.39 |
| 8 + EtOAc | | 1 | N | 446 | 25.3 | 80.9 | 2.49 | 4.18 | 169.40 |
| | | | N | 670 | 9.0 | 145.1 | 2.56 | 5.04 | 169.27 |
| | | 2 | N | 446 | 14.8 | 90.4 | 2.46 | 4.12 | 169.82 |
| | | | N | 670 | 8.8 | 158.4 | 2.09 | 4.87 | 169.27 |

*Comparative
11 mg of procatalyst is used for each polymerization test.
EtOAc = Ethyl Acetate
NM = Not measured When ethyl acetate (EtOAc) is used as a secondary donor, the resulting catalyst shows good activity and good selectivity.

onate) displays obvious improvement in XS, especially when D donor is used.

TABLE 8

Effects of Halogenated Malonate as a Secondary Donor

| ID Compositions (mol %) | | | Procatalyst | $H_2$ | Activity | MFR | XS | | $T_{MF}$ |
|---|---|---|---|---|---|---|---|---|---|
| Compound 8 | BBzSi | EED | (mg) | (mmol) | (kg/g-hr) | (g/10 min) | (%) | PDI | (° C.) |
| 0 | 100 | D | 16.7 | 446 | 8.9 | 11.7 | 2.48 | 6.22 | 171.26 |
| 25 | 75 | D | 16.7 | 446 | 19.8 | 9.4 | 2.66 | 5.44 | 171.24 |
| 50 | 50 | D | 16.7 | 446 | 27.5 | 5.9 | 2.71 | 5.60 | 171.71 |
| 75 | 25 | D | 16.7 | 446 | 35.2 | 8.0 | 2.86 | 5.22 | 172.00 |
| 100 | 0 | D | 8.4 | 446 | 17.0 | 27.4 | 1.98 | 4.82 | 171.30 |
| 0 | 100 | N | 16.7 | 268 | 5.9 | 4.1 | 1.09 | 6.48 | 170.88 |
| 25 | 75 | N | 16.7 | 268 | 18.4 | 4.0 | 1.02 | 5.97 | 170.84 |
| 50 | 50 | N | 16.7 | 268 | 23.4 | 5.8 | 1.68 | 5.60 | 171.01 |
| 75 | 25 | N | 16.7 | 268 | 17.1 | 5.2 | 1.17 | 5.40 | 169.83 |
| 100 | 100 | N | 8.4 | 313 | 11.2 | 40.8 | 2.3 | 4.38 | 170.36 |

BBzSi = Bis(benzyloxy)dimethylsilane
*Comparative

BenMag precursor is typically used as procatalyst precursor when BBzSi is used as internal electron donor because BBzSi typically exhibits poor activity with other precursors. Through a combination of a MagTi precursor, a halogenated malonate (8) and BBzSi as internal electron donor, it is possible to achieve a balance for catalyst activity, XS, $T_{MF}$, and PDI so that the catalyst becomes commercially viable.

It is specifically intended that the present disclosure not be limited to the embodiments and illustrations contained herein, but include modified forms of those embodiments including portions of the embodiments and combinations of elements of different embodiments as come within the scope of the following claims.

The invention claimed is:

1. A catalyst composition comprising:
a procatalyst composition comprising a magnesium moiety; a titanium moiety; and
an internal electron donor comprising a 2-fluoro-malonate with the structure (II)

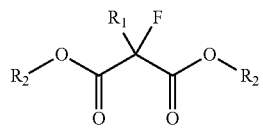

(II)

wherein $R_1$ and $R_2$ are the same or different, and further wherein $R_1$ is selected from the group consisting of a $C_3$-$C_{20}$ secondary alkyl group, a $C_4$-$C_{20}$ tertiary alkyl group, a $C_6$-$C_{20}$ aryl group, and a $C_7$-$C_{20}$ alkylaryl group; and
$R_2$ is selected from the group consisting of a $C_1$-$C_{20}$ primary alkyl group and a substituted or unsubstituted $C_2$-$C_{20}$ 1-alkenyl group;
a cocatalyst; and
optionally an external electron donor.

2. The catalyst composition of claim 1 wherein the external electron donor is selected from the group consisting of dicyclopentyldimethoxysilane, n-propyltrimethoxysilane and combinations thereof.

3. The procatalyst composition of claim 1, wherein $R_1$ is selected from the group consisting of, an isopropyl group, a tert-butyl, a cyclohexyl group, and a cyclopentyl group.

4. The procatalyst composition of claim 1 wherein the internal electron donor comprises diethyl 2-fluoro-2-cyclohexyl-malonate.

5. The procatalyst composition of claim 1 wherein the internal electron donor comprises diethyl 2-fluoro-2-isopropyl-malonate.

6. The procatalyst composition of claim 1 wherein the internal electron donor comprises diethyl 2-cylcopentyl-2-fluoro-malonate.

7. The procatalyst composition of claim 1 wherein the 2-fluoro-malonate is a compounded 2-fluoro-malonate.

8. The procatalyst composition of claim 1 comprising greater than 5 wt % of the 2-fluoro-malonate.

9. The procatalyst composition of claim 1 wherein the internal electron donor is a mixed internal electron donor comprising the 2-fluoro-malonate and an electron donor component.

10. The procatalyst composition of claim 9 wherein the electron donor component is selected from the group consisting of a $C_1$-$C_{20}$ unsubstituted or substituted hydrocarbyl ester of a $C_1$-$C_{20}$ unsubstituted or substituted aliphatic or aromatic carboxylic acid.

11. The procatalyst composition of claim 9 wherein the electron donor component is selected from the group consisting of ethyl acetate and bis(benzoyloxy)dimethylsilane.

12. The procatalyst composition of claim 1 comprising the external electron donor and an activity limiting agent.

* * * * *